United States Patent
Burov et al.

Patent Number: 6,150,751
Date of Patent: *Nov. 21, 2000

[54] PIEZOELECTRIC STEP MOTOR

[75] Inventors: Sergey Vyacheslavovich Burov, Arkhangelsk; Jury Vladimirovich Okatov, Severodvinsk, both of Russian Federation

[73] Assignee: Samsung Electronics Co., Ltd., Rep. of Korea

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/011,369

[22] PCT Filed: Jun. 5, 1997

[86] PCT No.: PCT/RU97/00177

§ 371 Date: Feb. 4, 1998

§ 102(e) Date: Feb. 4, 1998

[87] PCT Pub. No.: WO97/47073

PCT Pub. Date: Dec. 11, 1997

[30] Foreign Application Priority Data

Jun. 5, 1996 [RU] Russian Federation ............. 96111314

[51] Int. Cl.[7] ....................................... H01L 41/05

[52] U.S. Cl. ........................................ 310/328; 310/323.02

[58] Field of Search ................................. 310/323, 328, 310/323.02

[56] References Cited

U.S. PATENT DOCUMENTS

| | | | |
|---|---|---|---|
| 5,043,621 | 8/1991 | Culp | 310/316 |
| 5,068,566 | 11/1991 | Culp | 310/328 |
| 5,136,201 | 8/1992 | Culp | 310/328 |
| 5,144,187 | 9/1992 | Culp | 310/328 |
| 5,182,484 | 1/1993 | Culp | 310/328 |
| 5,241,235 | 8/1993 | Culp | 310/328 |
| 5,273,238 | 12/1993 | Sato | 244/105 |

FOREIGN PATENT DOCUMENTS

| | | |
|---|---|---|
| 0112454 | 10/1983 | European Pat. Off. . |
| 0360975 | 4/1990 | European Pat. Off. . |
| 60002081 | 8/1985 | Japan . |
| 60082072 | 10/1985 | Japan . |
| 573828 | 10/1977 | U.S.S.R. . |
| 738016 | 5/1980 | U.S.S.R. . |

*Primary Examiner*—Elvin Enad
*Assistant Examiner*—Peter Medley
*Attorney, Agent, or Firm*—Piper Marbury Rudnick & Wolfe

[57] ABSTRACT

A piezoelectric stepping motor comprises a cylindrical housing (1), fixing units and a movable part (4). The fixing units are made in the form of two shifting-fixing (2) and rotary-fixing (3) piezoelectric units arranged one behind the other in a longitudinal plane.

5 Claims, 3 Drawing Sheets

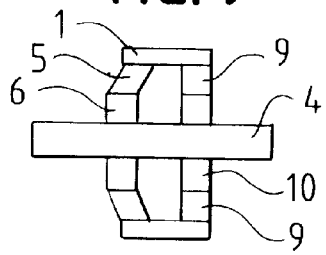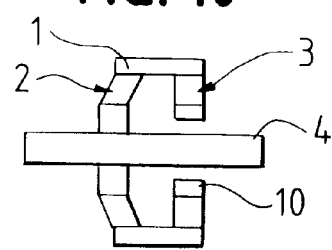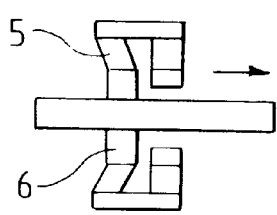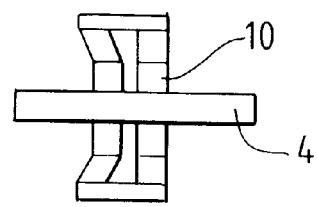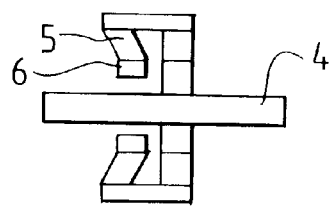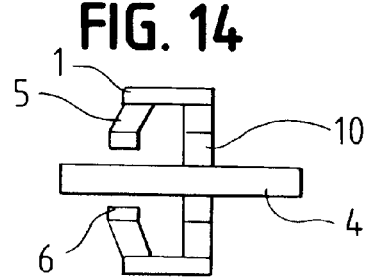

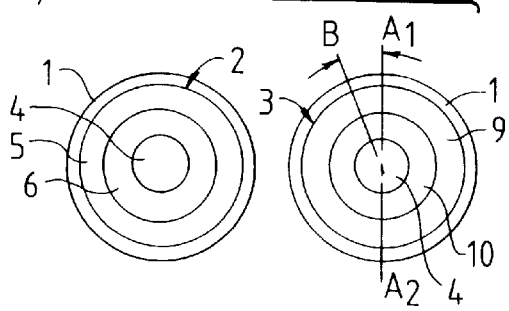
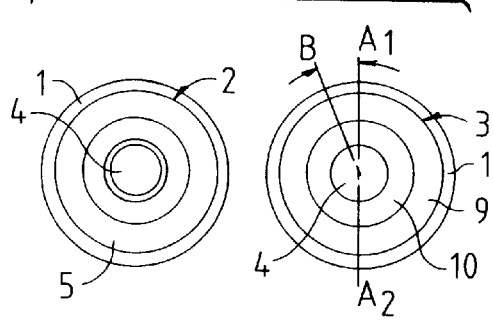
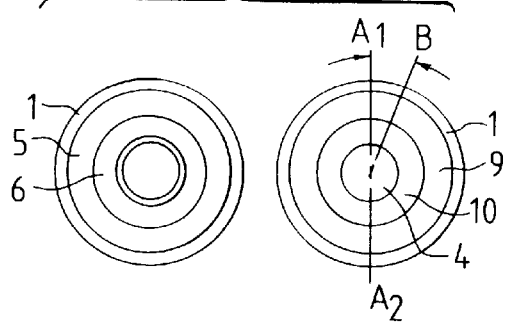
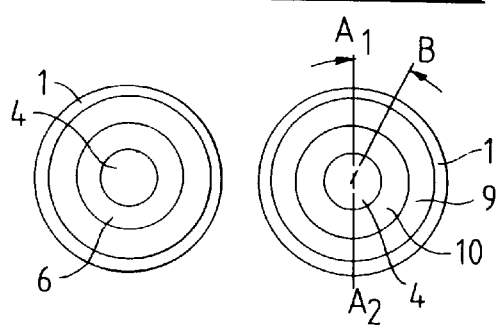
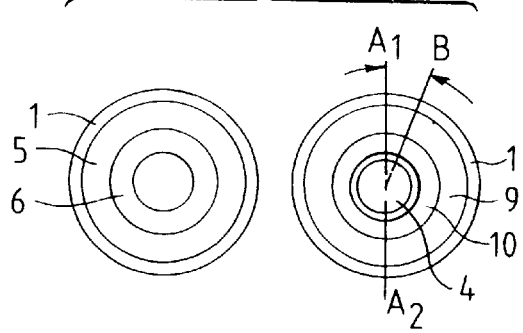
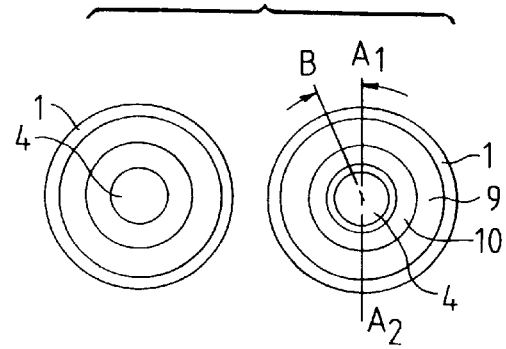

PIEZOELECTRIC STEP MOTOR

TECHNICAL FIELD

The present invention relates to the field of electric motors and, more specifically, it relates to piezoelectric stepping motors.

BACKGROUND OF THE INVENTION

Known in the art is a piezoelectric motor which stator comprises a piezoelectric hollow cylinder having inside a cylindrical rotor, frictionally interacting with the stator (SU, A, 573828).

However, this motor cannot perform a linear displacement of the cylindrical rotor.

Also known in the art is a piezoelectric linear stepping motor comprising a housing having fixing units secured in it and a movable part with a working member (SU, A, 720576).

However, this piezoelectric motor has a complicated design, performs only a linear displacement of the movable part and cannot rotate the movable part.

SUMMARY OF THE INVENTION

The basic object of the present invention is to create a piezoelectric stepping motor which constructive embodiment would make it possible to simplify its design and manufacturing technology, to increase motor forces and the accuracy in positioning the movable part during its rotation, linear displacement and combined motion (simultaneous rotation and linear displacement).

This object is achieved by providing a piezoelectric stepping motor comprising a housing having fixing units secured therein and a movable part, in which motor, according to the invention, the fixing units comprise at least two shifting-fixing and rotary-fixing piezoelectric units arranged one behind the other in a longitudinal plane, or the fixing units comprise at least two pairs of piezoelectric units which are disposed in one transverse plane and shaped in the form of sectors.

The housing may be movable, and the piezoelectric units may be secured on a stationary cylindrical rod.

The piezoelectric cells may be made in the form of a set of piezoelectric rings or their sectors which electrodes are connected in parallel alternately, in which case the direction of polarization of each successive piezoelectric ring or sector is opposite to that of the previous one.

The gaps between the piezoelectric units are preferably filled with an elastic insulating material.

Such constructive embodiment of the claimed stepping motor makes it possible to simplify the design and manufacturing technology, to increase the forces developed by the motor and the accuracy in positioning the movable part during its rotation, linear displacement and to perform a combined movement (rotation and linear displacement).

BRIEF DESCRIPTION OF THE DRAWINGS

The invention is further described by way of example with reference to the accompanying drawings, in which

FIG. 5 is a longitudinal section of the motor shown in FIG. 5;

FIGS. 9–14 show the working time steps of the piezoelectric stepping motor during linear displacement of the movable part, a longitudinal section;

FIG. 15 shows the first working time steps of the motor during rotation of the movable part, cross sections of the two piezoelectric units;

FIGS. 15–20 show other working time steps of the piezoelectric stepping motor during the rotation of the movable part.

THE BEST EMBODIMENTS OF THE INVENTION

Figure 1:
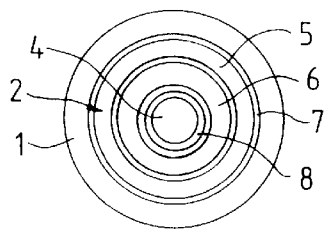
FIG. 1 is a front view of the claimed piezoelectric stepping motor (the first embodiment)
Figure 2:
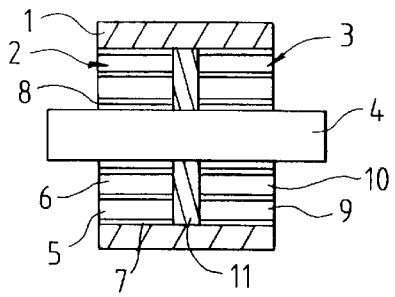
FIG. 2 is a longitudinal section of the motor shown in FIG. 1.

The piezoelectric stepping motor according to the first embodiment of the invention comprises a cylindrical housing 1 (FIG. 1), fixing devices in the form of two piezoelectric units 2 (FIG. 2) and 3 and a movable part 4 made in the form of a cylindrical rod. The piezoelectric unit 2 is a shifting-fixing one and consists of interconnected (for example, glued) elements: a shifting piezoelectric cell 5, a fixing piezoelectric cell 6, insulators 7 and a friction element 8. The piezoelectric unit 3 is a rotary-fixing one and consists of a rotary piezoelectric cell 9, a fixing piezoelectric cell 10, insulators 7 and a friction element 8.

The shifting piezoelectric cell 5 has a vector of its initial polarization directed at an angle to the longitudinal axis of the motor. The shifting piezoelectric cell 5 performs the displacement of the movable part 4 along the longitudinal axis of the motor.

The fixing piezoelectric units 2 and 3 provide a fixation of the movable part 4, and the vector of its initial polarization is directed (radially) normal to the longitudinal axis of the motor.

The friction elements 8 are made in the form of a split ring providing tighter clamping of the movable part 4 by the fixing piezoelectric cells 6 and 10.

Each piezoelectric cell has electrodes connected to wires (not shown in the drawing).

The gaps between the piezoelectric units 2 and 3 are filled with an elastic insulating material 11.

Other embodiments of the piezoelectric stepping motor according to the invention are possible.

Figure 3:
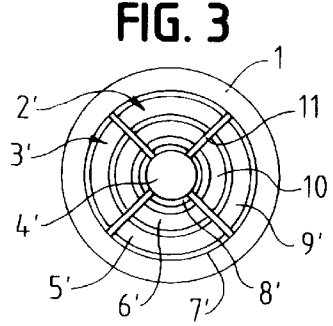
FIG. 3 is a front view of the second embodiment of the motor.
Figure 4:
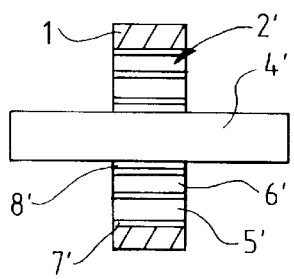
FIG. 4 is a longitudinal section of the motor shown in FIG. 3.

In the second embodiment of the motor shown in FIGS. 3 and 4, where characters 2'–9' represent parts analogous to those represented by characters 2–9, respectively, of the first embodiement, piezoelectric units 2' and 3' are disposed in one transverse plane and are made in the form of sectors.

Figure 5:
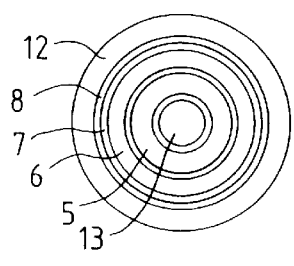
FIG. 5 is a front view of the third embodiment of the motor.
Figure 6:
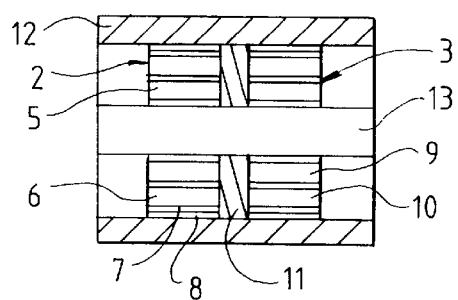
FIG. 6 is a longitudinal section of the motor shown in FIG. 5.
Figure 7:
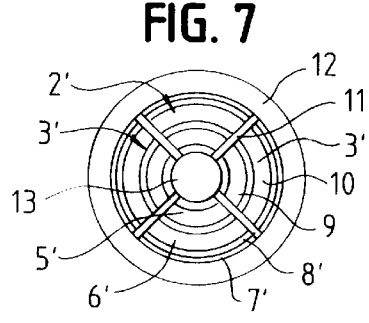
FIG. 7 is a front view of the fourth embodiment of the motor.

The third embodiment of the motor differs from the first one in that the movable part 4 (FIGS. 5 and 6) is stationary while the cylindrical housing 11 rotates, the piezoelectric units 2 and 3 being secured on a stationary cylindrical rod 13.

Figure 8:
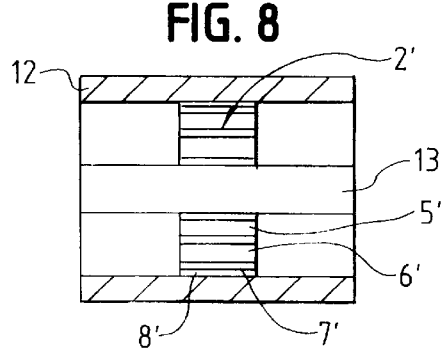
FIG. 8 is a longitudinal section of the motor shown in FIG. 7.

In the fourth embodiment, similar to the second embodiment, the cylindrical housing 12 (FIGS. 10 and 8)

can move while the piezoelectric units 2' and 3' are disposed in one transverse plane and secured on the cylindrical rod 13.

The motor according to invention operates as follows, using the first embodiment by example.

On applying a positive voltage to the electrodes of shifting piezoelectric cell 5, the inverse piezoelectric effect results in a shift of its internal part leftwards relative to the external part secured on the housing. And when a negative voltage is applied to the shifting piezoelectric cell 5, the internal part is shifted rightwards. When the positive voltage is applied to the electrodes of the rotary piezoelectric cells 9, the inverse piezoelectric effect results in a shift of the internal part through an angle $\alpha$ counterclockwise relative to the diametral line $A_1 A_2$, in which case the point B located on the internal part of the ring is displaced along the arc for an angle $\alpha$ counterclockwise. When the negative voltage is applied to the electrodes of the rotary piezoelectric cell 9, the internal part of the ring is shifted through an angle $\alpha$ clockwise relative to the diametral line $A_1 A_2$, in which case the point B is displaced along the arc for a an angle $\alpha$ clockwise. When the positive voltage is applied to the fixing piezoelectric cells 6 and 10, the movable part 4 is squeezed while the applying the negative voltage to these piezoelectric cells they are pushed apart from the movable part 4.

The piezoelectric stepping motor can perform various types of movements: a linear displacement of the movable part; a rotary motion; a combined linear and rotary motion; various combinations of these movements.

The working cycle consists of six time steps.

FIGS. 9–14 show time steps of the working cycle of the piezoelectric stepping motor with a linear displacement of the movable part 4. In this case, the shifting piezoelectric cell 5 and the fixing piezoelectric cell 6 of the piezoelectric unit 2 and the fixing piezoelectric cell 10 of the piezoelectric unit 3 take part in the operation.

In the first time step the positive voltage is applied to the piezoelectric cells 5 (FIG. 9), 6 and 10, in which case the internal part of the shifting piezoelectric cell 5 and the fixing piezoelectric cell 6 of the piezoelectric unit are shifted leftwards, and the piezoelectric cells 6 and 10 squeeze the movable part 4. The rotary piezoelectric cell 9 takes no part in the linear displacement and can occupy any position that is not changed during the operation of the motor.

In the second time step the negative voltage is applied to the fixing piezoelectric cell 10 (FIG. 10) and it is pushed apart from the movable part 4.

In the third time step the negative voltage is applied to the shifting piezoelectric cell 5 (FIG. 12) and, moving rightwards, it displaces the movable part 4 to the right for one step.

In the fourth time step the positive voltage is applied to the fixing piezoelectric cell 10 (FIG. 12), and it squeezes the movable part.

In the fifth time step the negative voltage is applied to the fixing piezoelectric cell 6 (FIG. 13), and it is pushed apart from the movable part 4.

In the sixth time step the positive voltage is applied to the piezoelectric units 5 (FIG. 14), and it is displaced leftwards together with the fixing piezoelectric cell 6. When repeating the working cycle, the movable part is displaced linearly and stepwise to the right.

During the rotation of the movable part 4 the motor operation is executed as shown in FIGS. 15–20. All piezoelectric cells take part in this process except for the shifting piezoelectric cell 5 which can occupy any position remaining constant during this operation. The working cycle consists of six time steps.

FIG. 15 shows the position corresponding to the first time step. The positive voltage is applied to the piezoelectric cells 6, 9 and 10, in which case the rotary piezoelectric cell 9 is turned through an angle $\alpha$ counterclockwise, and the fixing piezoelectric cells 6 and 10 clamp the movable part 4.

In the second time step the piezoelectric unit 3 (FIG. 16) is in the same state, the negative voltage is applied to the fixing piezoelectric cell 5 of the piezoelectric unit 2, and it is pushed apart from the movable part 4.

In the third time step the negative voltage is applied to the rotary piezoelectric cell 9 (FIG. 17) which turns the piezoelectric cell 10 through an angle $2\alpha$ clockwise together with the movable part 4.

In the fourth time step the positive voltage is applied to the fixing piezoelectric cell 6 (FIG. 18), and it squeezes the movable part 4.

In the fifth time step the negative voltage is applied to the fixing piezoelectric cell 10 (FIG. 19), and it is pushed apart from the movable part 4.

In the sixth time step the positive voltage is applied to the rotary piezoelectric cell 9 (FIG. 20) which turns the fixing piezoelectric cell 10 through an angle $2\alpha$ counterclockwise.

The reversing motion is performed by changing the sequence in applying the voltage to the fixing piezoelectric cells.

To increase the power output the piezoelectric stepping motor can be provided with additional piezoelectric units which may be arranged both in the transverse and longitudinal plane of the motor.

The claimed piezoelectric stepping motor has a simple design and manufacturing technology, small size and mass, a high force on the movable part and makes it possible to combine the linear displacement and the rotation of the movable part.

In the description of the embodiments of the invention, for better understanding a specific narrow terminology is used. However, the invention is not limited by the accepted terms and one should keep in mind that each such term covers all equivalent terms for the units working in a similar manner and used for the solution of the same technical problems.

Although the present invention is described in connection with preferable type of its realizations, it is clear that changes and modifications may be made without deviation from the idea and scope of the invention and those skilled in the art may easily understand that.

These changes and modifications are considered not extending beyond the essences and scope of the invention and the appended claims.

INDUSTRIAL APPLICABILITY

The invention can be used as a slave mechanism in electrical engineering, telemechanics, radio engineering and automation.

What is claimed is:

1. A piezoelectric linear stepping motor comprising:
  a) a housing having an inner surface;
  b) first and second cylindrical, hollow piezoelectric units attached to the inner surface of the housing, each of the piezoelectric units being in separate transverse planes, the first piezoelectric unit having a cylindrical shifting piezoelectric cell, a cylindrical fixing piezoelectric cell attached to the shifting piezoelectric cell, and a friction member attached to the fixing piezoelectric cell, the second piezoelectric unit having a cylindrical rotary piezoelectric cell, a cylindrical fixing piezoelectric cell, and a friction member attached to the fixing piezoelectric cell; and c) a shaft, which frictionally interacts with at least one friction member, the shifting and fixing cells of the first piezoelectric unit and the fixing cell of the second piezoelectric unit being configured to operate sequentially in order to linearly move the shaft, the rotary and fixing cells of the second piezoelectric unit and the fixing cell of the first piezoelectric unit being configured to operate sequentially in order to rotate the shaft.

2. A piezoelectric linear stepping motor, comprising:

a) a housing having an inner surface;

b) a first and second sets of cylindrical, hollow piezoelectric sectors attached to the inner surface of the housing, each of the first set of piezoelectric sectors having a shifting piezoelectric cell, a fixing piezoelectric cell attached to the shifting piezoelectric cell, and a friction member attached to the fixing piezoelectric cell, each of the second set of piezoelectric sectors having a rotary piezoelectric cell, a fixing piezoelectric cell and a friction member attached to the fixing piezoelectric cell; and c) a movable shaft, which frictionally interacts with at least one friction member, the shifting and fixing piezoelectric cells of the first set of piezoelectric sectors and the fixing cells of the second set of piezoelectric sectors being configured to operate sequentially in order to linearly move the shaft, the rotary and fixing piezoelectric cells of the second set of piezoelectric sectors and the fixing cells of the first set of piezoelectric sectors being configured to operate sequentially in order to rotate the shaft.

3. The motor of claim 2, wherein the fixing piezoelectric cells of the first set of piezoelectric sectors are disposed between the shifting piezoelectric cells and the shaft, and wherein the fixing piezoelectric cells of the second set of piezoelectric sectors are disposed between the rotary piezoelectric cells and the shaft.

4. The motor of claim 3, further comprising an insulating material disposed between and separating the piezoelectric sectors.

5. The motor of claim 3, wherein the shaft has at least one guide, and wherein at least one friction member has a guide configured to frictionally interact with at least one of the shaft guides.

* * * * *